(12) United States Patent
Miura et al.

(10) Patent No.: US 8,169,538 B2
(45) Date of Patent: May 1, 2012

(54) IMAGE ROTATION ADAPTOR

(75) Inventors: Toshihito Miura, Tokyo (JP);
Kazumichi Tsuchiya, Saitama (JP);
Mitsuyuki Saito, Saitama (JP)

(73) Assignees: Nippon Hoso Kyokai, Tokyo (JP);
Fujinon Corporation, Saitama (JP)

( * ) Notice: Subject to any disclaimer, the term of this patent is extended or adjusted under 35 U.S.C. 154(b) by 506 days.

(21) Appl. No.: 12/343,322

(22) Filed: Dec. 23, 2008

(65) Prior Publication Data

US 2009/0167933 A1 Jul. 2, 2009

(30) Foreign Application Priority Data

Dec. 26, 2007 (JP) ................................. 2007-334384

(51) Int. Cl.
*H04N 5/238* (2006.01)
(52) U.S. Cl. ........................ 348/369; 348/337
(58) Field of Classification Search .................. 352/110, 352/106, 105; 359/197.1, 200.1; 396/111, 396/71; 348/377, 337, 343, 367, 368
See application file for complete search history.

(56) References Cited

U.S. PATENT DOCUMENTS

| | | | | |
|---|---|---|---|---|
| 3,945,713 A * | 3/1976 | Doi et al. | | 359/423 |
| 5,557,329 A | 9/1996 | Lim | | |
| 6,185,044 B1 * | 2/2001 | Yoshikawa et al. | | 359/629 |
| 6,259,563 B1 * | 7/2001 | Eckerl | | 359/625 |
| 6,471,637 B1 * | 10/2002 | Green et al. | | 600/109 |
| 7,164,135 B2 * | 1/2007 | Kim | | 250/370.08 |
| 2003/0137582 A1 * | 7/2003 | Filous et al. | | 348/37 |
| 2003/0160888 A1 * | 8/2003 | Yoshikawa | | 348/357 |
| 2009/0167921 A1 * | 7/2009 | Mogi | | 348/333.11 |
| 2011/0013913 A1 * | 1/2011 | Kuo et al. | | 398/131 |

FOREIGN PATENT DOCUMENTS

| | | |
|---|---|---|
| EP | 0 841 583 A | 5/1998 |
| JP | 50-034552 A | 4/1975 |
| JP | 50-58617 | 5/1975 |
| JP | 55-1087 Y2 | 1/1980 |
| JP | 58030283 A | 2/1983 |
| JP | 59-101632 A | 6/1984 |
| JP | 61-157918 U | 9/1986 |
| JP | 64-35534 A | 2/1989 |
| JP | 2-44185 B2 | 10/1990 |
| JP | 7-203466 A | 8/1995 |
| JP | 8-286109 A | 11/1996 |

* cited by examiner

*Primary Examiner* — Nicholas Giles
*Assistant Examiner* — Abdelaaziz Tissire
(74) *Attorney, Agent, or Firm* — Birch, Stewart, Kolasch & Birch, LLP (57) ABSTRACT

An image rotation adapter that is configured to be detachably mounted between an image capturing lens and a camera main body in a camera and includes
a first prism configured to invert the object image passed through the image capturing lens by reflecting an odd number of times object light passed through the image capturing lens and
a second prism that is supported rotatably about the optical axis, and that is configured to further invert the object image inverted by the first prism by reflecting an odd number of times the object light passed through the first prism;
an operation device configured to perform an operation to rotate the second prism; and
a relay optical system configured to re-form the object image passed through the second prism on the light receiving surface of the image pickup device.

4 Claims, 6 Drawing Sheets

IMAGE ROTATION ADAPTOR

BACKGROUND OF THE INVENTION

1. Field of the Invention

The present invention relates to an image rotation adapter, and more particularly to an image rotation adapter which is mounted between an image capturing lens and a camera in order to give a special effect to a video image captured by the camera.

2. Description of the Related Art

As a technique for giving a special effect to a video image captured by a camera, there is known a method of using a special filter. The method is to generate striations from a bright part of an object by inserting a special filter, such as cross, snow cross, and mirage filters into an optical path (patent documents 1 to 4). In this case, the filter inserted into the optical path is exchanged by using a turret mechanism.

As a technique for giving a special effect by rotating a video image captured by a camera, there is known a technique configured to rotate an image pickup device mounted in the camera together with a color separation prism (patent document 5).

Patent document 1: Japanese Examined Application Publication No. 2-44185

Patent document 2: Japanese Patent Application Laid-Open No. 64-35534

Patent document 3: Japanese Patent Application Laid-Open No. 59-101632

Patent document 4: Japanese Utility Model Application Publication No. 55-1087

Patent document 5: Japanese Patent Application Laid-Open No. 7-203466

However, the method of giving a special effect to a video image by using a special filter, as described in patent documents 1 to 4, has a disadvantage that the filter is exchanged by using a turret mechanism, so that the size of the apparatus is increased.

Further, the method of giving a special effect by rotating a video image by rotating an image pickup device has a disadvantage that a mechanism for rotating the image pickup device needs to be provided on the camera side and that such configuration is not possible in an existing camera. Further, it is also possible to provide the mechanism for rotating the image pickup device on the lens side, but even in such case, there is a disadvantage that such configuration is not possible in an existing lens. Further, when the mechanism for rotating the image pickup device is provided on the camera side, there is a disadvantage that the size of the camera is increased and that the configuration of the camera becomes complicated. Further, when the image pickup device is rotated, there is also a disadvantage that a noise is generated in a signal outputted from the image pickup device.

SUMMARY OF THE INVENTION

The present invention has been made in view of the above described circumstances. An object of the present invention is to provide an image rotation adaptor which can be used with an existing camera and an existing image capturing lens and which is capable of giving a special effect to a video image captured by the camera.

In order to achieve the above described object, according to a first aspect of the present invention, there is provided an image rotation adapter that is configured to be detachably mounted between an image capturing lens and a camera main body in a camera in which the image capturing lens is detachably provided to the camera main body and in which an object image passed through the image capturing lens is formed on a light receiving surface of an image pickup device via a prism incorporated in the camera main body, and that is configured to rotate the object image formed on the light receiving surface of the image pickup device. The image rotation adapter is featured by including: a first prism that is formed to have an optical path length close to the optical path length of the prism incorporated in the camera main body, that is arranged in an optical path before the object image passed through the image capturing lens is formed at a predetermined position in the image rotation adapter, and that is configured to invert the object image passed through the image capturing lens by reflecting an odd number of times object light passed through the image capturing lens; a second prism that is formed to have an incident optical axis and an emitting optical axis on the same axis, that is arranged on the optical axis of the object light passed through the first prism and once formed as the image and is supported rotatably about the optical axis, and that is configured to further invert the object image inverted by the first prism by reflecting an odd number of times the object light passed through the first prism; an operation device configured to perform an operation to rotate the second prism; and a relay optical system that re-forms the object image passed through the second prism on the light receiving surface of the image pickup device.

According to the first aspect of the present invention, when the image rotation adapter according to the present invention is mounted between the image capturing lens and the camera main body, and when the second prism is rotated by the operation device, the object image formed on the light receiving surface of the image pickup device is rotated about the optical axis. That is, the second prism is configured such that the incident optical axis and the emitting optical axis are formed on the same axis, and that the incident light is emitted after being reflected an odd number of times (the incident image is inverted and then emitted). Thus, when the second prism is rotated about the optical axis, the object image formed on the light receiving surface of the image pickup device is rotated about the optical axis.

On the other hand, when the object image formed on the light receiving surface of the image pickup device is intended to be rotated only by the second prism, the processing for electrically inverting the image needs to be performed on the camera side because the image emitted from the second prism is inverted.

However, according to the present invention, the first prism is arranged in the preceding stage of the second prism, and hence the object image is inverted beforehand by the first prism. Thus, the object image which is the same as the image passed through the image capturing lens is formed on the light receiving surface of the image pickup device. That is, the image inverted by the first prism is further inverted by the second prism so as to be returned to the original image. Therefore, the same image as the image captured without the use of the adapter can be captured on the camera side.

Further, when the adapter is mounted between the camera main body and the image capturing lens, an image is not formed at the position at which the image is assumed to be formed by the image capturing lens, (at the position of the light receiving surface of the image pickup device). However, in the present invention, it is configured such that an image is once formed in the adaptor, and that the image is re-formed by the relay optical system. Thus, an image can be captured in the same state as the state in which the adapter is not used. That is, even when the adaptor is attached, an image can be formed at the image forming position (the position on the light receiving surface of the image pickup device) at which the image is assumed to be formed by the image capturing lens.

Further, in the present invention, the first prism is provided at a position before the image is once formed in the adapter, and is formed to have the optical path length close to the optical path length of the prism (for example, color separation prism or the like) incorporated in the camera main body. Thus, it is possible to form the object image on the light receiving surface of the image pickup device without deteriorating the performance of the image capturing lens. That is, in the image capturing lens, the aberration, and the like, is designed in consideration of the prism incorporated in the camera main body. Thus, when the first prism is formed to have the optical path length close to the optical path length of the prism incorporated in the camera main body, it is possible to form the image in the adaptor in the state in which the aberration, and the like, is taken into account. Further, when the image formed in the adaptor is re-formed by the relay optical system, it is possible to form the image on the light receiving surface of the image pickup device without deteriorating the performance of the image capturing lens.

In this way, according to the image rotation adapter of the present invention, it is possible to perform the special image capturing in which the image is rotated, by using an existing camera and an existing image capturing lens without deteriorating the performance of the lens. Further, the configuration can also be made compact.

In order to achieve the above described object, according to a second aspect of the present invention, there is provided the image rotation adaptor featured in that in the first aspect, the first prism and the second prism are respectively configured to reflect the incident object light at least three times or more and to emit the reflected object light.

According to the second aspect of the present invention, the first prism and the second prism are respectively configured so as to reflect the incident object light at least three times or more and to emit the reflected object light. This makes it possible to reduce the whole length of the adaptor and thereby to make the configuration of the adaptor compact.

In order to achieve the above described object, according to a third aspect of the present invention, there is provided the image rotation adaptor featured in that in one of the first aspect and the second aspect, the operation device includes: a rotation drive device configured to rotate the second prism; an input device configured to input an instruction to rotate the second prism; and a control device configured to control the driving of the rotation drive device according to the input of the instruction of rotation from the input device.

According to the third aspect of the present invention, the second prism is rotatably driven according to the instruction of rotation from the input device. Thereby, the rotation operation can be easily performed.

According to the present invention, by using an existing camera and an existing image capturing lens, it is possible to give a special effect to a video image captured by the camera.

DETAILED DESCRIPTION OF THE PREFERRED EMBODIMENTS

In the following, preferred embodiments of an image rotation adaptor according to the present invention will be described in detail with reference to the accompanying drawings.

Figure 1A:
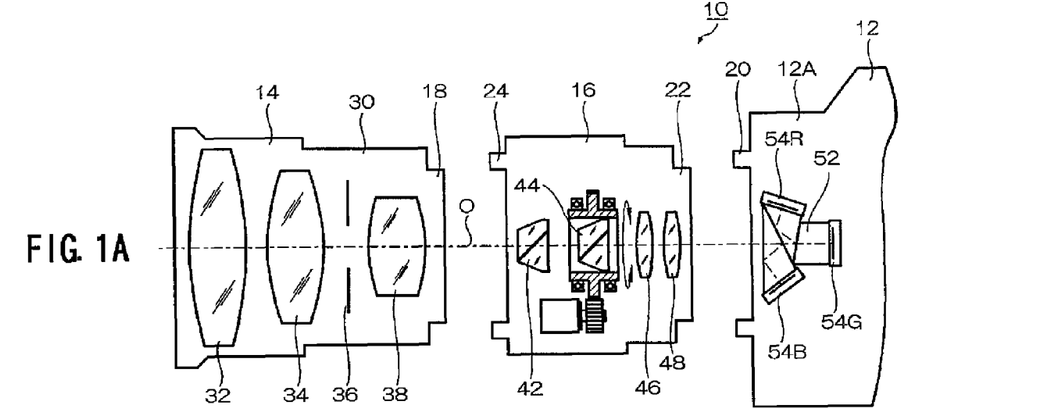
FIGS. 1A to 1C are figures showing a system configuration of a television camera system.
Figure 1B:
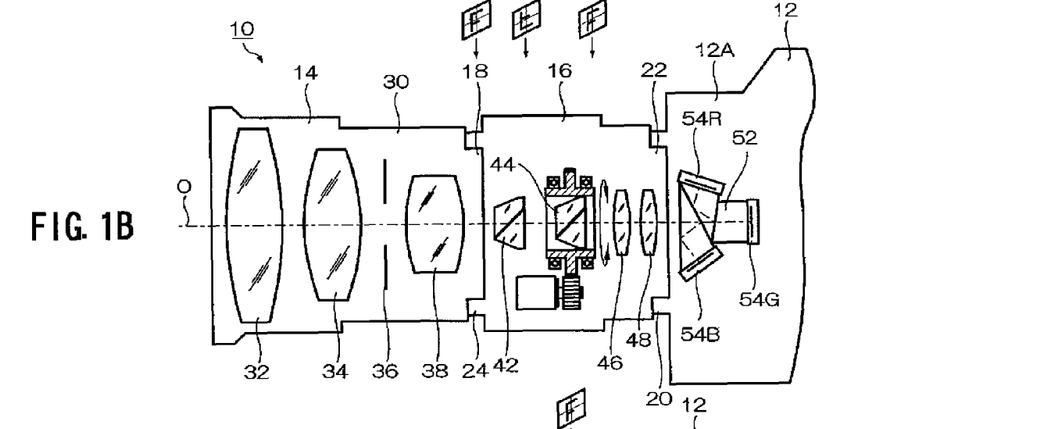
Figure 1C:
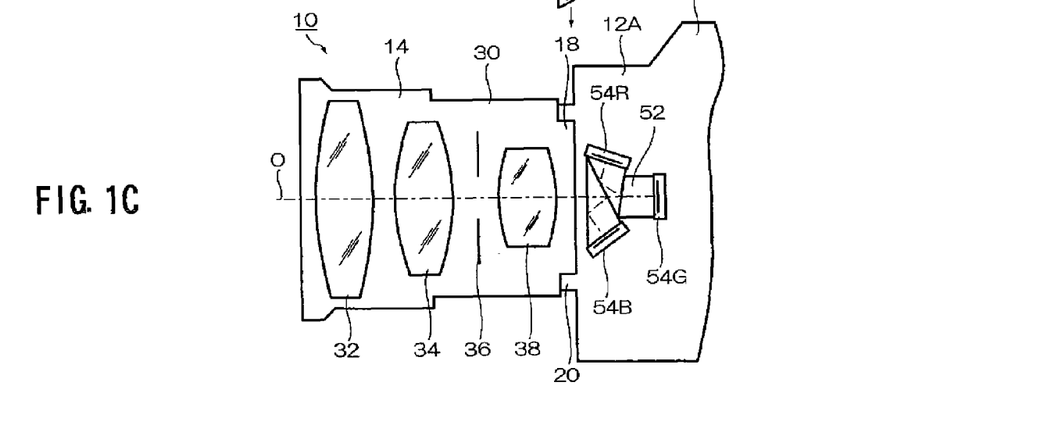

FIGS. 1A to 1C show a system configuration of a television camera system in which an image rotation adaptor according to the present invention is incorporated.

As shown in FIG. 1A, the television camera system 10 is configured by a television camera 12, an image capturing lens 14, and an image rotation adaptor 16.

The image rotation adaptor 16 is an adapter used to give a special effect to a video image captured by the television camera 12 by rotating the video image, and is mounted between the television camera 12 and the image capturing lens 14 as required. That is, as shown in FIG. 1B, when the special effect is given to the video image by rotating the video image, the image rotation adaptor 16 is mounted between the television camera 12 and the image capturing lens 14. When the special effect image capturing is not performed, the image rotation adaptor 16 is removed from the television camera 12. Therefore, when the special effect image capturing is not performed, the image capturing lens 14 is directly mounted to the television camera 12.

Note that a lens side mount 18 is provided at the rear end portion of the image capturing lens 14. Thus, the image capturing lens 14 is mounted to a camera main body 12A of the television camera 12 by attaching the lens side mount 18 to a camera side mount 20 provided at the distal end portion of the camera main body 12A.

The image rotation adaptor 16 is configured to be provided at the rear end portion thereof with a rear side mount 22 having the same configuration as that of the lens side mount 18, and is configured so as to be able to be mounted to the television camera 12 by attaching the rear side mount 22 to the camera side mount 20 of the television camera 12. Further, the image rotation adaptor 16 is configured such that a front side mount 24 having the same configuration as that of the camera side mount 20 is provided at the distal end portion of the image rotation adaptor 16, and that the image capturing lens 14 can be mounted to the image rotation adaptor 16 by attaching the lens side mount 18 of the image capturing lens 14 to the front side mount 24.

Figure 2:
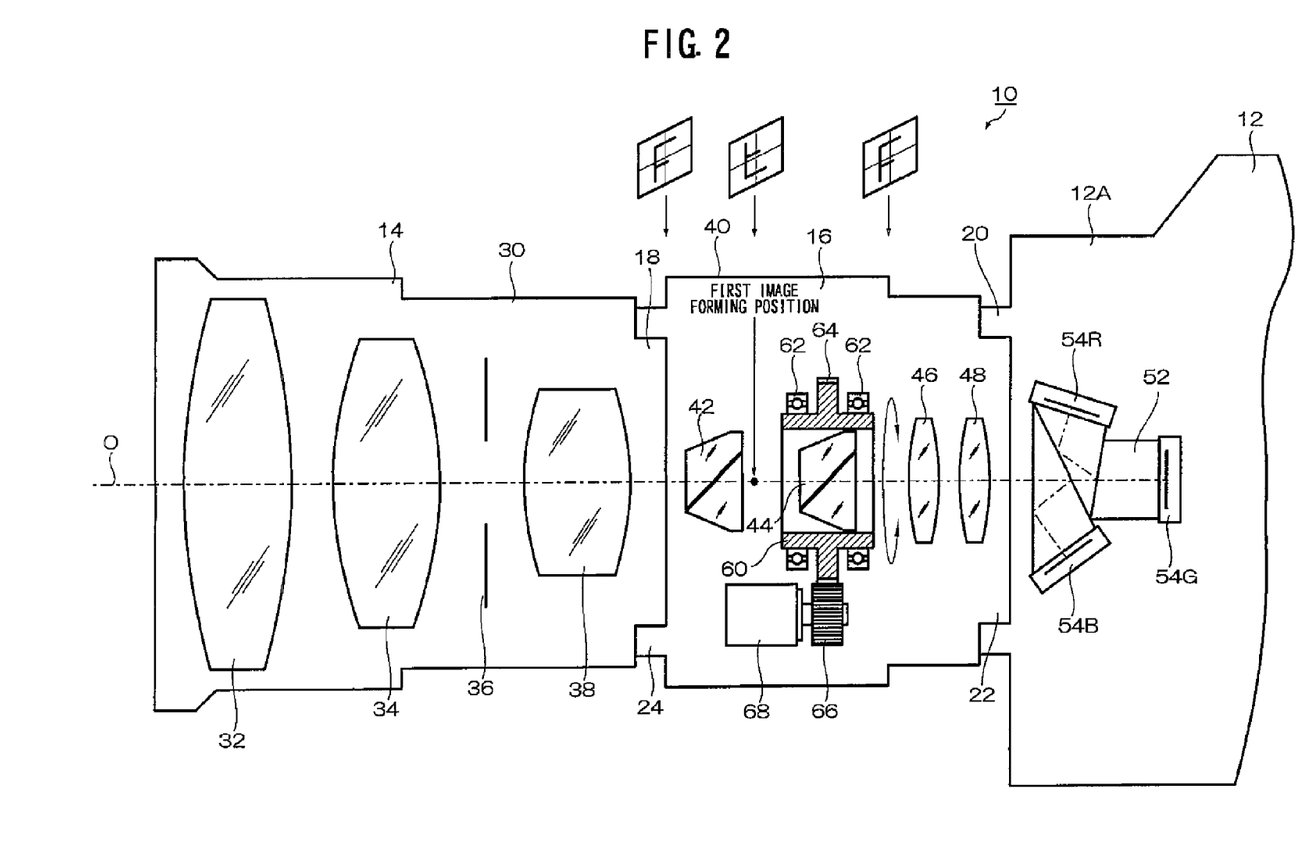
FIG. 2 is a figure showing a schematic configuration of an optical system of the television camera system.

FIG. 2 is a figure showing a schematic configuration of an optical system in the television camera system 10 shown in FIG. 1.

Note that the configuration of each lens is shown in a simplified manner in which a lens group configured by a plurality of lenses is represented by one lens.

As shown in FIG. 2, in a lens barrel 30 of the image capturing lens 14, a focus lens 32, a zoom lens 34, an iris 36, and a relay lens 38 are arranged in this order from the front side of the lens barrel 30. The object light made incident from the distal end of the image capturing lens 14 is allowed to pass through each of the lenses, and is emitted from the rear end of the image capturing lens 14.

In a case 40 of the image rotation adaptor 16, a first prism 42, a second prism 44, a first relay lens 46, and a second relay lens 48 are arranged on the optical axis O of the image capturing lens 14. The object light emitted from the rear end of the image capturing lens 14 is allowed to propagate along the optical axis O of the image capturing lens 14 so as to pass through the first prism 42, the second prism 44, the first relay lens 46, and the second relay lens 48. Then, the object light is emitted from the rear end of the image rotation adaptor 16.

In the camera main body 12A of the television camera 12, a color separation prism 52 is arranged on the optical axis O of the image capturing lens 14. The object light emitted from the rear end of the image rotation adaptor 16 is decomposed into each of color components of R (red), G (green), and B (blue) by the color separation prism 52. Then, the object light decomposed into each of the color components is made incident on the light receiving surface of each of image pickup devices 54R, 54G and 54B for the respective color components. The object light made incident on the light receiving surface of each of the image pickup devices 54R, 54G and 54B, is converted into an electric signal in each of the image pickup devices 54R, 54G and 54B, and is thereafter subjected to signal processing by a known image signal processing device, so as to be outputted or recorded in a recording medium, as a video signal of a predetermined form.

Figure 3:
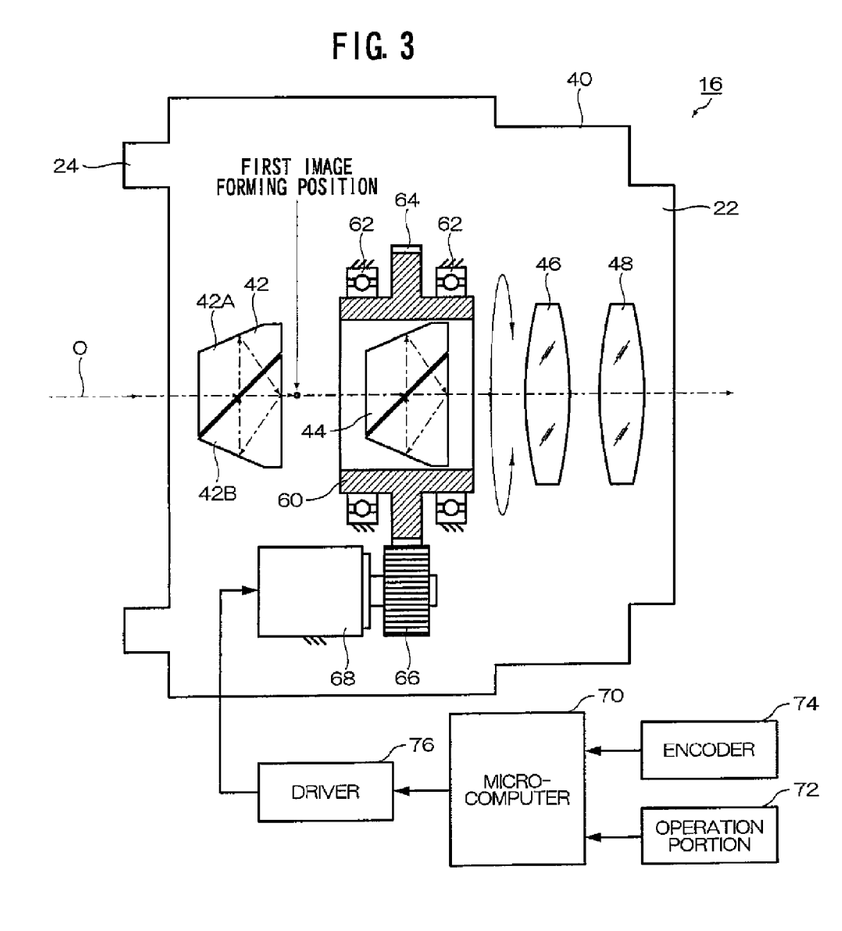
FIG. 3 is a schematic representation showing a configuration of an embodiment of an image rotation adaptor.

FIG. 3 is a schematic representation showing a configuration of an embodiment of the image rotation adaptor according to the present invention.

As described above, the image rotation adaptor 16 is configured such that the first prism 42, the second prism 44, the first relay lens 46, and the second relay lens 48 are arranged in the case 40 on the optical axis O of the image capturing lens 14, and that the object light emitted from the rear end of the image capturing lens 14 is allowed to pass through the first prism 42, the second prism 44, the first relay lens 46, and the second relay lens 48, so as to be emitted from the rear end of the image rotation adaptor 16.

The case 40 is formed in a cylindrical shape so as to have the front side mount 24 on the front end surface thereof and to have the rear side mount 22 on the rear end surface thereof.

The first prism 42 is configured by a Pechan prism, and is held by a holding frame (not shown), so as to be fixed and arranged on the optical axis O of the image capturing lens 14.

Figure 4:
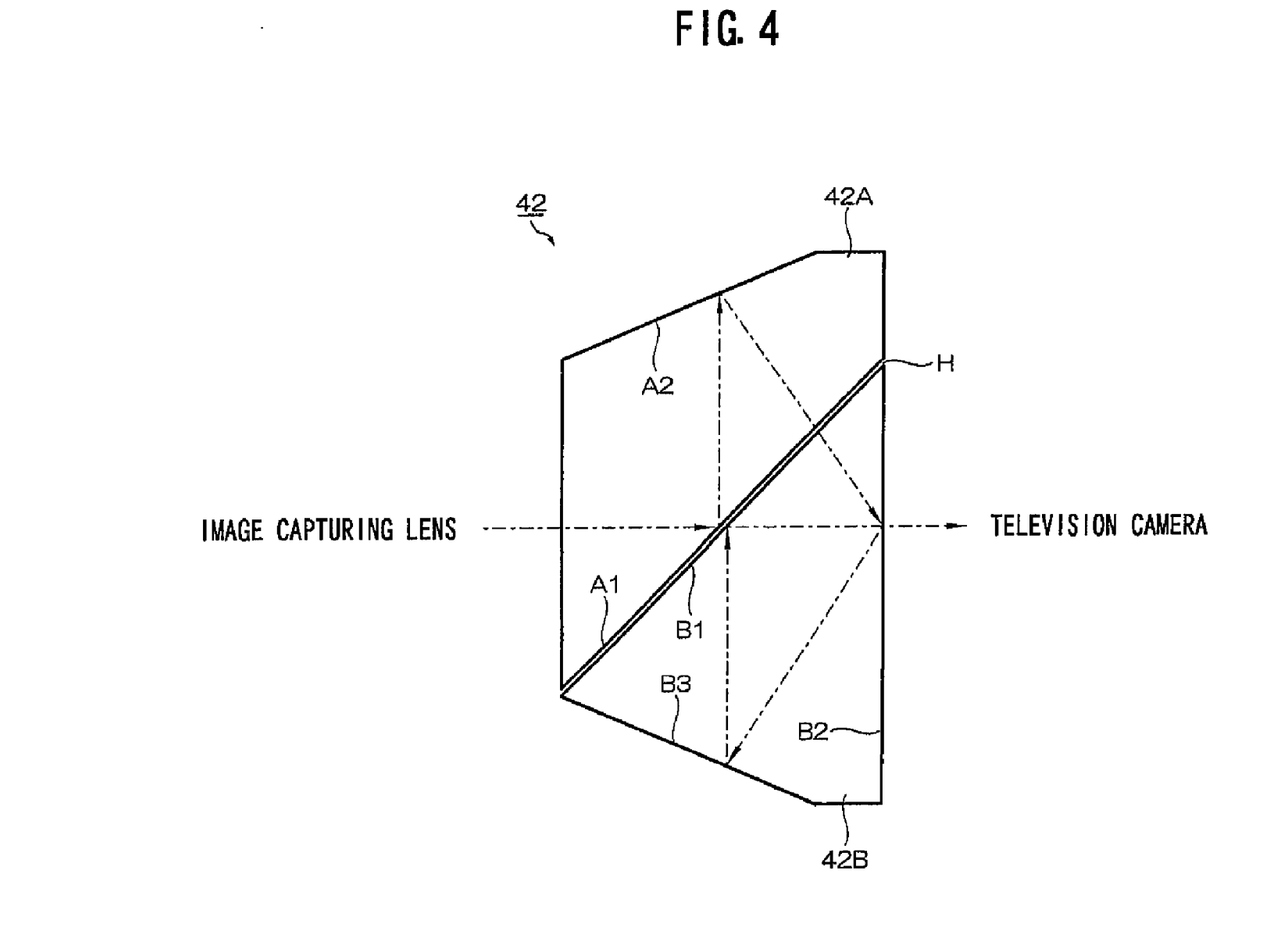
FIG. 4 is a figure showing a schematic configuration of a first prism (second prism)

The Pechan prism is a kind of a prism in which two triangular prisms are arranged to face each other via a thin air layer so that an optical path as shown in FIG. 4 is formed. That is, the light made incident on a first triangular prism 42A via the image capturing lens 14 is reflected by a surface A1, and is then reflected by a surface A2, so as to be emitted from the surface A1 into an air layer H. The light passed from the air layer H is made incident on a surface B1 of a second triangular prism 42B, so as to be reflected by the surface B2, and is then reflected by surfaces B3 and B1, so as to be emitted from the surface B2 to the outside. In this case, the light is emitted along the optical axis O.

In this way, the first prism 42 configured by the Pechan prism reflects five times the light which is made incident along the optical axis O, so as to thereby allow the reflected light to be emitted along the optical axis O. Also, the light is reflected an odd number of times, so that the image is inverted.

Note that the first prism 42 is formed to have the optical path length equal to the optical path length of the color separation prism 52 incorporated in the camera main body 12A.

The object light emitted from the first prism 42 is once formed as an image in a focused state between the first prism 42 and the second prism 44, and is then made incident on the second prism 44. Hereinafter, the position between the first prism 42 and the second prism 44, at which position the object image is formed, is referred to as a first image forming position.

Here, as described above, the first prism 42 is formed to have the optical path length equal to that of the color separation prism 52 incorporated in the camera main body 12A, and hence the image formed at the first image forming position is an image in which the aberration, and the like, estimated in the image capturing lens 14 is taken into account.

That is, in the image capturing lens 14 used for the television camera 12 in which the color separation prism 52 is included in the camera main body 12A, the aberration, and the like, is designed in consideration of the existence of the color separation prism 52. Therefore, an excellent image in which the aberration, and the like, is taken into account, can be formed at the first image forming position by setting the optical path length of the first prism 42 equal to the optical path length of the color separation prism 52.

The second prism 44 is also configured by the Pechan prism similarly to the first prism 42, and is arranged on the optical axis of the object light emitted from the first prism 42. In the present embodiment, the first prism 42 is configured by the Pechan prism and is formed to have the incident optical axis and the emitting optical axis on the same axis. Thus, the second prism 44 is also arranged on the optical axis O of the image capturing lens 14, similarly to the first prism 42.

Further, since the second prism 44 is configured by the Pechan prism similarly to the first prism 42, the object light made incident on the second prism 44 is reflected five times in the prism and is thereafter emitted along the optical axis O. Since the image is reflected an odd number of times, the image is inverted and then emitted.

Here, the image made incident on the second prism 44 is the image inverted by the first prism 42, and hence the inverted image is further inverted, so as to be returned to the original state. That is, the image emitted from the second prism 44 is the same as the image emitted from the image capturing lens 14 (=the image made incident on the first prism 42).

In this way, the second prism 44 has a function to return the image inverted by the first prism 42 to the original state by further inverting the inverted image by reflecting the inverted image an odd number of times.

The second prism 44 is held by a prism holding frame 60, so as to be arranged on the optical axis O of the image capturing lens 14.

The prism holding frame 60 is formed in a cylindrical shape, in the inner peripheral portion of which the second prism 44 is housed and held. The prism holding frame 60 is supported so as to be freely rotatable about the optical axis O by bearings 62 arranged in the case 40. The second prism 44 is rotated about the optical-axis O by rotating the prism holding frame 60.

A gear 64 is integrally formed on the outer periphery of the prism holding frame 60. A drive gear 66 is provided in mesh with the gear 64. The drive gear 66 is connected to an output shaft of a prism rotation drive motor 68 installed in the case 40, and is normally and reversely rotated by driving the prism rotation drive motor 68. Thus, the prism holding frame 60 is rotated by the rotation of the drive gear 66, so that the second prism 44 is rotated about the optical axis O.

In this way, the second prism 44 is rotated about the optical axis O by driving the prism rotation drive motor 68. Then, when the second prism 44 is rotated about the optical axis O, the object image emitted from the second prism 44 is rotated about the optical axis O. The object image is rotated at a speed twice the speed of the second prism 44. That is, when the second prism 44 is rotated by 45 degrees, the image emitted from the second prism 44 is rotated by 90 degrees. When the second prism 44 is rotated by 90 degrees, the image emitted from the second prism 44 is rotated by 180 degrees.

The drive of the prism rotation drive motor 68 is controlled by a microcomputer 70 which controls the drive of the prism rotation drive motor 68 on the basis of the operation information from an operation portion 72.

The operation portion 72 is configured by, for example, a normal rotation button to instruct the rotation in the normal direction (clockwise rotation), a reverse rotation button to instruct the rotation in the reverse direction (counterclockwise rotation), a reset button to forcibly return the image to an erected position (position at which the object image is erected), a speed volume to set the rotation speed, and the like, and is provided in the outer peripheral portion of the case 40. The operation portion 72 outputs to the microcomputer 70 a signal corresponding to an operation of each of the operation buttons.

Further, an encoder 74 is provided at the prism rotation drive motor 68, so that the information of rotation position of the output shaft, which position is detected by the encoder 74, is outputted to the microcomputer 70.

The microcomputer 70 outputs a drive signal to a motor driver 76 according to the signal inputted from the operation portion 72 and the encoder 74, so as to rotatably drive the prism rotation drive motor 68.

The object light emitted from the second prism 44 is allowed to pass through the first relay lens 46 and the second relay lens 48, and is emitted from the image rotation adaptor 16.

The first relay lens 46 and the second relay lens 48 configure a relay optical system, which converges the object light emitted from the second prism 44, so as to re-form an image on the light receiving surface of each of the image pickup devices 54R, 54G and 54B incorporated in the camera main body 12A.

Thereby, also in the case where the image rotation adaptor 16 is mounted, the same image is formed on the light receiving surface of each of the image pickup devices 54R, 54G and 54B as the image formed in the case where the image rotation adaptor 16 is not mounted.

The effects of the television camera system 10 according to the present embodiment configured as described above are as follows.

As described above, the image rotation adaptor 16 is used in the case where special effect image capturing is performed. Therefore, when the special effect image capturing is not performed, the image capturing is performed by directly mounting the image capturing lens 14 to the camera main body 12A as shown in FIG. 1C. In this case, the light passed through the image capturing lens 14 is directly made incident on the camera main body 12A, and is received by the image pickup devices 54R, 54G, and 54B via the color separation prism 52. Note that the ordinary image capturing can be performed even in the state in which the image rotation adaptor 16 is kept mounted.

On the other hand, when there is performed the special effect image capturing in which a video image is rotated as required, the image capturing is performed by mounting the image rotation adaptor 16 between the image capturing lens 14 and the camera main body 12A as shown in FIG. 1B.

When the image rotation adaptor 16 is mounted, the light passed through the image capturing lens 14 is received by the image pickup devices 54R, 54G and 54B via the image rotation adaptor 16. Specifically, after passed through the image capturing lens 14, the light is made incident on the image rotation adaptor 16 and is emitted to the television camera 12 via the first prism 42, the second prism 44, the first relay lens 46, and the second relay lens 48.

In this case, the object light is reflected five times in the first prism 42 when passed through the first prism 42, and is then emitted on the optical axis O from the first prism 42. Thereby, the image is inverted.

The object light passed through the first prism 42 is once formed as an image, and is thereafter made incident on the second prism 44. Then, the object light is reflected five times in the second prism 44, and is thereafter emitted on the optical axis O. Thereby, the inverted image is again inverted so as to be returned to the original state.

The object light passed through the second prism 44 is allowed to pass through the first relay lens 46 and the second relay lens 48 which configure the relay optical system, and is emitted from the image rotation adaptor 16. Then, the object light emitted from the image rotation adaptor 16 is formed as an image on the light receiving surface of each of the image pickup devices 54R, 54G and 54B via the color separation prism 52 of the television camera 12.

The object image formed on the light receiving surface of each of the image pickup devices 54R, 54G and 54B is rotated about the center of each of the image pickup devices 54R, 54G and 54B by rotating the second prism 44.

The amount of rotation of the object image formed on the light receiving surface of each of the image pickup devices 54R, 54G and 54B is twice the amount of rotation of the second prism 44. That is, when the second prism 44 is rotated by one turn, the object image formed on each of the image pickup devices 54R, 54G and 54B is rotated by two turns. Therefore, when the second prism 44 is rotated by 90 degrees, the object image formed on each of the image pickup devices 54R, 54G and 54B is rotated by 180 degrees.

The rotation operation of the second prism 44 is performed by the operation portion 72, and the second prism 44 is rotatably driven on the basis of the input from the operation portion 72. For example, when the normal rotation button of the operation portion 72 is operated (depressed), the operation signal is inputted into the microcomputer 70. The microcomputer 70 outputs a drive signal to the motor driver 76 on the basis of the operation signal from the operation portion 72, so as to rotatably drive the prism rotation drive motor 68. Thereby, the second prism 44 is rotated in the normal direction at a predetermined speed (rotation speed set by the speed volume), so that the object image formed on each of the image pickup devices 54R, 54G and 54B is rotated in the normal direction. Further, when the reverse rotation button of the operation portion 72 is operated (depressed), the operation signal is inputted into the microcomputer 70. The microcomputer 70 outputs a drive signal to the motor driver 76 on the basis of the operation signal from the operation portion 72, so as to rotatably drive the prism rotation drive motor 68. Thereby, the second prism 44 is rotated in the reverse direction at the predetermined speed, so that the object image formed on each of the image pickup devices 54R, 54G and 54B is rotated in the reverse direction.

In this way, when the operation portion 72 is operated, the second prism 44 is rotated and the object image formed on each of the image pickup devices 54R, 54G and 54B is rotated.

Note that the second prism 44 is located in a predetermined reference position in the initial state. In the position, the same image as the image formed at the time when the image rotation adaptor 16 is not mounted, is formed on the light receiving surface of each of the image pickup devices 54R, 54G and 54B. That is, the object image formed on the light receiving surface of each of the image pickup devices 54R, 54G and 54B, is changed (rotated) according to the rotation position of the second prism 44. Thus, in the initial state, the second prism 44 is positioned at the predetermined reference position so as to form the same object image as the object image formed at the time when the image rotation adaptor 16 is not mounted.

In this way, it is possible to perform the normal image capturing even in the state in which the image rotation adaptor 16 is kept mounted to the television camera 12. Thereby, even when the image capturing is performed by switching between the normal image capturing and the special effect image capturing, it is possible to use the image rotation adaptor 16 without performing complicated detaching operation.

Further, when the reset button provided in the operation portion 72 is operated, the second prism 44 is forcibly returned to the reference position. Thereby, it is possible to capture the same object image as the object image captured at the time when the image rotation adaptor 16 is not mounted (the erected object image which is not inclined (rotated)).

Note that various forms may be adopted as the form in which the second prism 44 is rotated by operating the operation portion 72. For example, it is possible to adopt a form in which the second prism 44 is rotated while the normal rotation button or the reverse rotation button is depressed, and possible to adopt a form in which the second prism 44 is rotated by a predetermined number of turns at the time when the normal rotation button or the reverse rotation button is depressed once.

As described above, when the image rotation adaptor 16 according to the present embodiment is mounted, it is possible to perform special effect image capturing in which a video image is captured by being arbitrarily rotated as required. Also, the image rotation adaptor 16 can be used with the existing image capturing lens 14 and the existing television camera 12, and hence it is possible to easily add the special effect function to the existing television camera system.

Further, even in the case where the image rotation adaptor 16 according to the present embodiment is mounted to the television camera 12, it is possible to capture the same video image as the video image captured in the case where the image rotation adaptor 16 is not mounted. Thus, in the case where the image rotation adaptor 16 is mounted, it is possible to perform the image capturing operation with the same operation feeling as that in the case where the image rotation adaptor 16 is not mounted. That is, it is possible to perform the image capturing operation by the same operation as usual, without performing the inversion processing of the captured video image, the switching operation of the setting for performing the inversion processing, and the like. Thereby, it is possible to build a system which can be conveniently used.

Further, the image rotation adaptor 16 according to the present embodiment is configured so as to once form an image in the image rotation adaptor 16. In this case, the first prism 42 having the optical path length equal to the optical path length of the color separation prism 52 in the television camera 12 is arranged in the optical path before the image is formed, and hence it is possible to form an excellent image in which the aberration, and the like, is taken into account. Thereby, it is possible to capture an excellent video image by the television camera 12 without deteriorating the performance of the image capturing lens 14.

Note that when the object image is to be simply rotated, it is only necessary to arrange in the image capturing optical path a prism (odd number of times reflection prism) for reflecting the object light an odd number of times and to rotate the prism (in the case of a prism which reflects the object light an even number of times, the object image cannot be rotated even by rotating the prism).

However, when the odd number of times reflection prism is used, there is a problem that the image after it is emitted from the prism becomes a back image (horizontally inverted image) of the image before it is made incident on the prism. Therefore, it is necessary to return the back image to the front image (horizontally non-inverted image) in somewhere.

In order to return the back image to the front image, it is only necessary to again use an odd number of times reflection prism, but the space for arranging the odd number of times reflection prism is required. Thus, in the case of the adaptor as in the present invention, there is a problem that the size of the adaptor is increased.

Further, it is possible to return the back image to the front image by performing image processing to the captured image. However, in the case of this method, there is a problem that such image processing function needs to be added to the side of the television camera.

On the other hand, when the adapter as in the present invention is arranged between the existing image capturing lens and the existing television camera, the positional relationship between the image capturing lens and the television camera is shifted by the thickness of the adapter, and the image forming position is also shifted.

Thus, in the present invention, it is configured such that the object image is once formed in the adaptor and is further relayed by the relay optical system so as to be re-formed on the image pickup device in the television camera.

In this case, when it is configured such that a prism having the optical path length equal to the optical path length of the prism (color separation prism) in the television camera is arranged in the optical path before the object image is once formed, the image can be formed in an optimum state in which the aberration, and the like, estimated in the existing image capturing lens is taken into account.

There is no problem on performance, provided that a prism having an optical path length equal to the optical path length of the prism (color separation prism) in the television camera is used as the prism arranged in the optical path before the object image is once formed. However, a space for arranging the prism is required and hence in the case of the adaptor as in the present invention, there is a problem that the size of the adaptor is increased.

As described above, in a simple consideration, there is no problem on performance in the case where there are arranged a prism arranged in the optical path before the object image is once formed, an odd number of times reflection prism for rotating the object image, and an odd number of times reflection prism for returning the back image to the front image, respectively. However, there still remains the problem that the size of the adaptor is increased.

The present invention is to also solve the above described problem that the size of the adaptor is increased, in such a manner that the prism arranged in the optical path before the object image is once formed is also used as the odd number of times reflection prism for returning the back image to the front image.

Note that in the image rotation adaptor 16 according to the above described embodiment, the optical path length of the first prism 42 is set equal to the optical path length of the color separation prism 52 in the television camera 12. However, the optical path length of the first prism 42 and the optical path length of the color separation prism 52 in the television camera 12 need not necessarily be set completely equal to each other, and may be set to values close to each other within an allowable range. That is, it is preferred that the optical path length of the first prism 42 is set equal to the optical path length of the prism arranged in the television camera. However, it is possible to capture an excellent video image with no problem in the case where the difference between the optical path lengths is set within a range of about ±5 mm. It is more preferred that the difference between the optical path length of the first prism 42 and the optical path length of the prism arranged in the television camera is set within a range of about ±2 mm.

Further, as the material of the first prism 42, it is preferred to use the same material as that of the prism arranged in the television camera 12. However, the same material needs not necessarily be used, and different materials may also be used, provided that the same effect can be obtained.

Further, in the above described embodiment, as a configuration of the operation portion 72, the normal rotation button, the reverse rotation button, the reset button, and the speed volume are exemplified, but the configuration of the operation portion 72 is not limited to this. It is preferred to configure the operation portion 72 such that various rotation operation instructions can be inputted as required.

Figure 5:
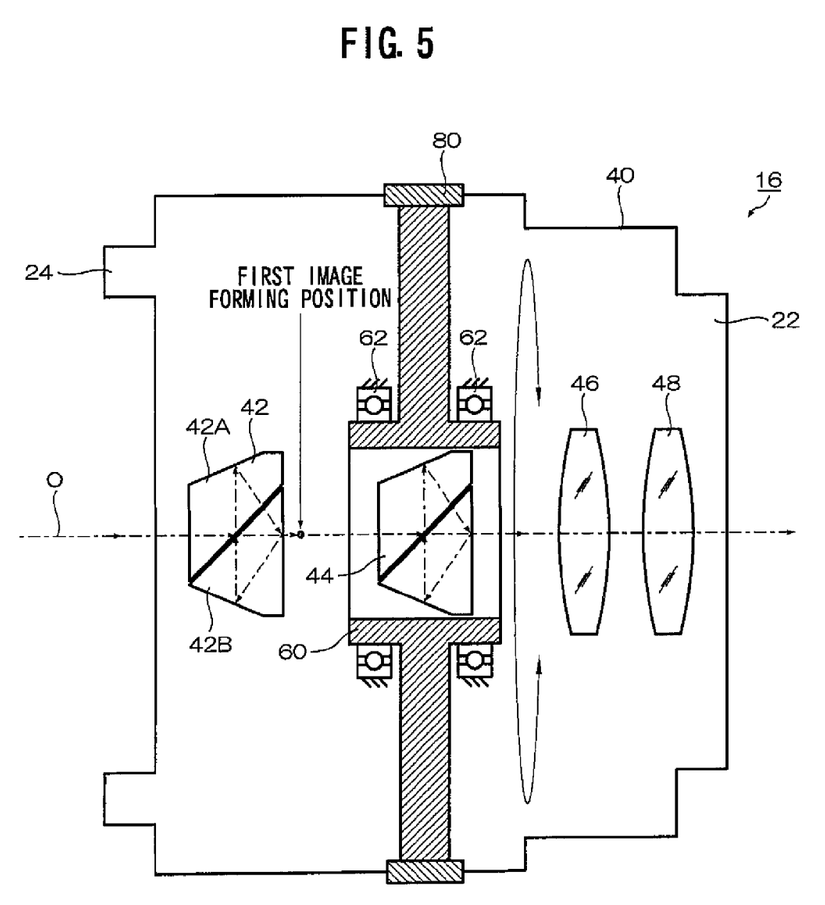
FIG. 5 is a schematic representation showing another embodiment of the image rotation adaptor.

Further, in the above described embodiment, it is configured such that the second prism 44 is rotatably driven by the prism rotation drive motor 68, but the second prism 44 may also be manually rotated. For example, as shown in FIG. 5, it may also be configured such that a rotation operation ring 80 is rotatably provided on the outer periphery of the case 40, and that the rotation operation ring 80 is linked to the prism holding frame 60 so as to allow the prism holding frame 60 to be manually rotated. In this case, it is preferred to form a scale on the outer periphery of the case 40 so that the reference position and the rotation amount can be visually checked.

Further, in the above described embodiment, the first prism 42 and the second prism 44 are configured by the Pechan prism, but the prism which configures the first prism 42 and the second prism 44 is not limited to this. That is, a prism having the other configuration may also be used, as long as the prism is configured to invert an image by reflecting incident light an odd number of times and to emit the inverted image. In this case, a prism, in which the incident optical axis and the emitting optical axis are positioned on the same axis, is assumed to be used as the second prism 44. However, a prism, in which the incident optical axis and the emitting optical axis are arranged at least in parallel with each other, may be used as the first prism 42. Further, it is not necessary to use the first prism 42 and the second prism 44 which have the same configuration.

FIGS. 6A to 6D are figures showing examples of prisms configured so as to invert an image by reflecting incident light an odd number of times and to output the inverted image, as described above.

Figure 6A:
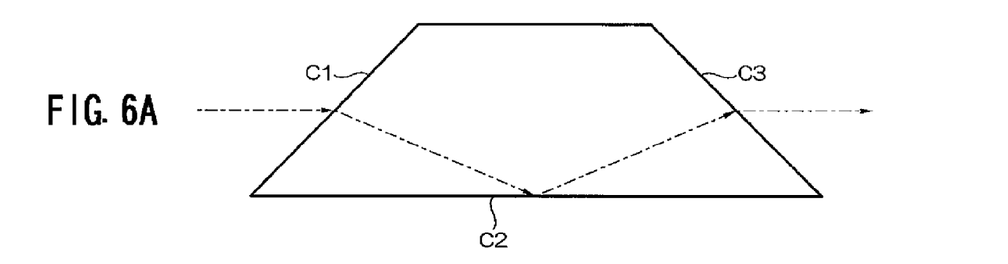
FIGS. 6A to 6D are figures showing examples of usable prisms.

FIG. 6A shows a prism (so-called a dove prism) configured so as to invert an image by reflecting incident light once and to output the inverted image. The light made incident on the surface C1 is reflected by the surface C2 and is then emitted from the surface C3.

Figure 6B:
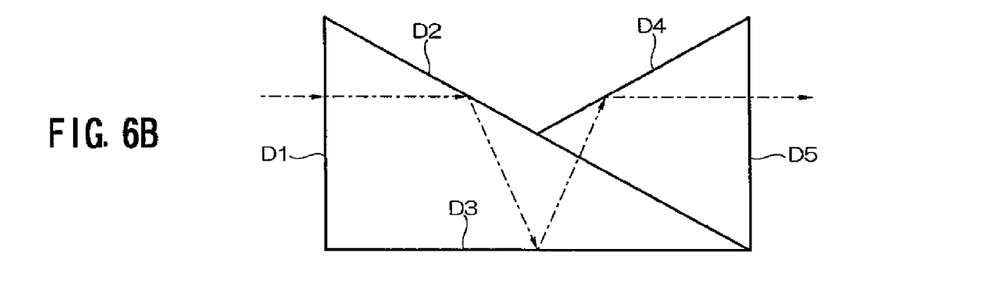

FIG. 6B shows a prism configured so as to invert an image by reflecting incident light three times and to output the inverted image. The light made incident on the surface D1 is reflected by the surfaces D2, D3 and D4, and is then emitted from the surface D5.

Figure 6C:
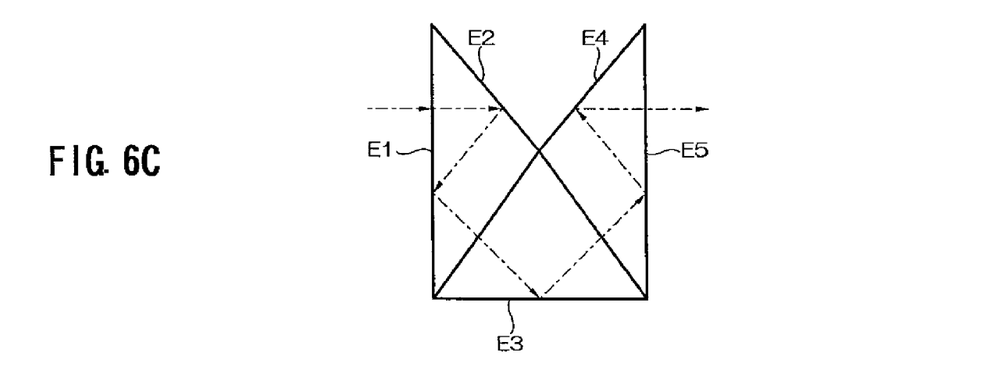

FIG. 6C shows a prism configured so as to invert an image by reflecting incident light by five times and to output the inverted image. The light made incident on the surface E1 is reflected by the surfaces E2, E1, E3, E5 and E4, and is then emitted from the surface E5.

Figure 6D:
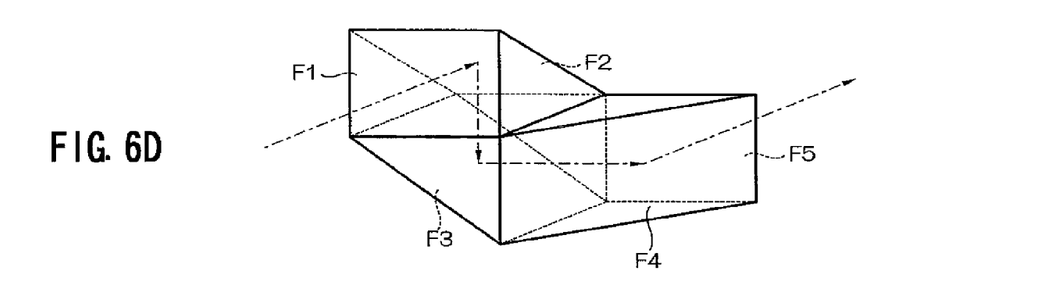

FIG. 6D shows a prism that is configured by bonding three triangular prisms and that is configured to invert an image by reflecting incident light by three times and to output the inverted image. The light made incident on the surface F1 is reflected by the surfaces F2, F3 and F4, and is then emitted from the surface F5. Note that in the prism having such configuration, the optical axis of the light made incident on the surface F1 and the optical axis of the light emitted from the surface F5 are in parallel with each other, but are not positioned on the same axis. Therefore, the prism having such configuration can be used only as the first prism 42.

Note that in the prism used as the first prism 42 as described above, the incident optical axis and the emitting optical axis need not necessarily be positioned on the same axis. Further, the incident optical axis and the emitting optical axis need not necessarily be in parallel with each other. That is, the first prism 42 may only be configured to reflect the incident light an odd number of times.

In this way, a prism of any configuration may be used, as long as it is configured to invert an image by reflecting incident light an odd number of times and to output the inverted image.

However, in consideration of the size reduction of the apparatus, it is preferred to use a prism that is configured to reflect the incident light at least three times or more in the prism and to output the reflected light. That is, when the incident light is outputted by being reflected a plurality of times, the total length of the prism in the optical axis direction can be reduced. Thereby the total length of the image rotation adaptor 16 can be reduced.

In particular, the optical path length of the first prism 42 needs to be set equal to the optical path length of the color separation prism 52. Thus, in order to reduce the size of the apparatus while satisfying the requirement, it is preferred to use a prism that is configured to reflect the incident light at least three times or more and to output the reflected light.

Note that in the above described embodiment, there is described a case where the image rotation adaptor 16 according to the present invention is applied to the television camera system, but the present invention is applicable to all types of camera systems configured by a camera main body and an exchangeable image capturing lens.

What is claimed is:

1. An image rotation adapter that is configured to be detachably mounted between an image capturing lens and a camera main body in a camera in which the image capturing lens is detachably provided to the camera main body and in which an object image passed through the image capturing lens is formed on a light receiving surface of an image pickup device via a prism incorporated in the camera main body, and that is configured to rotate the object image formed on the light receiving surface of the image pickup device, the image rotation adapter comprising:

a first prism that is formed to have an optical path length within ±5 mm of the optical path length of the prism incorporated in the camera main body, that is arranged in an optical path before the object image passed through the image capturing lens is formed at a predetermined position in the image rotation adapter, and that is configured to invert the object image passed through the image capturing lens by reflecting an odd number of times object light passed through the image capturing lens;

a second prism that is formed to have an incident optical axis and an emitting optical axis on the same axis, that is arranged on the optical axis of the object light passed through the first prism and once formed as the image and is supported rotatably about the optical axis, and that is configured to further invert the object image inverted by the first prism by reflecting an odd number of times the object light passed through the first prism, so as to return the image to the same state as when emitted from the image capturing lens, the second prism being located at a predetermined reference position in an initial state such that the same image is formed on the light receiving surface as when the image rotation adapter is not mounted;

an operation device configured to perform an operation to rotate the second prism; and a relay optical system configured to re-form the object image passed through the second prism on the light receiving surface of the image pickup device.

2. The image rotation adapter according to claim 1, wherein each of the first prism and the second prism reflects the incident object light at least three times or more and emits the reflected object light.

3. The image rotation adapter according to claim 1, wherein the operation device comprises:

a rotation drive device configured to rotate the second prism;

an input device configured to input a rotation instruction for the second prism; and a control device configured to control the driving of the rotation drive device according to the input of the rotation instruction from the input device.

4. The image rotation adapter according to claim 2, wherein the operation device comprises:

a rotation drive device configured to rotate the second prism;

an input device configured to input a rotation instruction for the second prism; and a control device configured to control the driving of the rotation drive device according to the input of the rotation instruction from the input device.

* * * * *

UNITED STATES PATENT AND TRADEMARK OFFICE
CERTIFICATE OF CORRECTION

PATENT NO. : 8,169,538 B2
APPLICATION NO. : 12/343322
DATED : May 1, 2012
INVENTOR(S) : Toshihito Miura et al.

It is certified that error appears in the above-identified patent and that said Letters Patent is hereby corrected as shown below:

ON THE TITLE PAGE:

At item (73), Assignees, change:

"(73) Assignees: Nippon Hoso Kyokai, Tokyo (JP);
               Fujinon Corporation, Saitama (JP)"

to

--(73) Assignees: Nippon Hoso Kyokai, Tokyo (JP);
                Fujifilm Corporation, Tokyo (JP)--.

Signed and Sealed this
Second Day of October, 2012

David J. Kappos
*Director of the United States Patent and Trademark Office*